(12) United States Patent
Alexanian et al.

(10) Patent No.: US 11,668,788 B2
(45) Date of Patent: Jun. 6, 2023

(54) PHASE-COMPENSATED WAVEGUIDES AND RELATED SENSOR ASSEMBLIES

(71) Applicant: VEONEER US, INC., Southfield, MI (US)

(72) Inventors: Angelos Alexanian, Lexington, MA (US); Konstantinos Konstantinidis, Schweinfurt (DE)

(73) Assignee: Veoneer US, LLC, Southfield, MI (US)

( * ) Notice: Subject to any disclaimer, the term of this patent is extended or adjusted under 35 U.S.C. 154(b) by 140 days.

(21) Appl. No.: 17/370,922

(22) Filed: Jul. 8, 2021

(65) Prior Publication Data

US 2023/0011772 A1    Jan. 12, 2023

(51) Int. Cl.
*H01Q 13/10* (2006.01)
*H01Q 1/32* (2006.01)
*G01S 7/03* (2006.01)
*G01S 13/931* (2020.01)

(52) U.S. Cl.
CPC ........... *G01S 7/032* (2013.01); *H01Q 1/3233* (2013.01); *H01Q 13/10* (2013.01); *G01S 13/931* (2013.01)

(58) Field of Classification Search
CPC ........ H01Q 13/10; H01Q 13/12; H01Q 13/18; H01Q 1/3233; H01Q 21/0043
See application file for complete search history.

(56) References Cited

U.S. PATENT DOCUMENTS

| | | | |
|---|---|---|---|
| 2,990,547 A | 6/1961 | McDougal | |
| 3,231,894 A | 1/1966 | Nagai | |
| 4,328,502 A * | 5/1982 | Scharp | H01Q 13/22 343/771 |
| 6,198,453 B1 * | 3/2001 | Chew | H01Q 21/0043 343/771 |
| 6,483,481 B1 | 11/2002 | Sievenpiper et al. | |
| 7,132,905 B2 | 11/2006 | Sano | |
| 8,058,998 B2 | 11/2011 | Burnside et al. | |

(Continued)

FOREIGN PATENT DOCUMENTS

| | | |
|---|---|---|
| CN | 102931492 | 2/2015 |
| CN | 105633585 | 6/2016 |

(Continued)

OTHER PUBLICATIONS

CN102931492, Feb. 11, 2015, Beijing Institute of Telemetry Technology, Machine Translation (9 pages).

(Continued)

*Primary Examiner* — Jason Crawford
(74) *Attorney, Agent, or Firm* — Matthew D. Thayne; Thayne and Davis LLC

(57) ABSTRACT

Waveguide and/or antenna structures for use in RADAR sensor assemblies and the like. In some embodiments, an antenna module may comprise a waveguide and an antenna structure, such as one or more slots/slits operably coupled with the waveguide groove. The antenna structure may be positioned and configured to deliver electromagnetic radiation from the waveguide therethrough. A plurality of tapering surfaces may be formed along the antenna structure. Each of the plurality of tapering surfaces may be formed so as to alternate between opposing sides of the antenna structure and be spaced apart from each adjacent tapering surface of the plurality of tapering surfaces.

20 Claims, 6 Drawing Sheets

(56) References Cited

U.S. PATENT DOCUMENTS

| | | |
|---|---|---|
| 8,779,995 B2 | 7/2014 | Kirino et al. |
| 8,803,638 B2 | 8/2014 | Kildal |
| 9,153,851 B2 | 10/2015 | Nakamura |
| 9,252,475 B2 | 2/2016 | Milyakh et al. |
| 9,666,931 B2 | 5/2017 | Suzuki |
| 10,090,600 B2 | 10/2018 | Kirino et al. |
| 10,164,344 B2 | 12/2018 | Kirino et al. |
| 11,171,399 B2* | 11/2021 | Alexanian ............ H01Q 1/3233 |
| 11,349,220 B2* | 5/2022 | Alexanian ............ H01Q 1/3233 |
| 2009/0153432 A1 | 6/2009 | Manasson et al. |
| 2010/0238085 A1 | 9/2010 | Fuh et al. |
| 2011/0050356 A1 | 3/2011 | Nakamura et al. |
| 2014/0354498 A1 | 12/2014 | Balma et al. |
| 2016/0020522 A1 | 1/2016 | Sano et al. |
| 2016/0126637 A1 | 5/2016 | Uemichi |
| 2017/0187121 A1 | 6/2017 | Kirino et al. |
| 2017/0279193 A1 | 9/2017 | Chauloux |
| 2018/0269591 A1 | 9/2018 | Kirino et al. |
| 2018/0301820 A1 | 10/2018 | Bregman et al. |
| 2018/0351261 A1 | 12/2018 | Kamo et al. |
| 2021/0028528 A1 | 1/2021 | Alexanian et al. |
| 2021/0028549 A1* | 1/2021 | Doyle .................... H01Q 13/18 |
| 2021/0091470 A1* | 3/2021 | Ahmadloo ........... H01Q 13/206 |
| 2021/0247512 A1* | 8/2021 | Alexanian ............ H01Q 1/3233 |
| 2021/0249777 A1* | 8/2021 | Alexanian .......... H01Q 21/0043 |
| 2022/0278458 A1* | 9/2022 | Alexanian .......... H01Q 13/0233 |
| 2022/0302596 A1* | 9/2022 | Alexanian ............. G01S 13/931 |

FOREIGN PATENT DOCUMENTS

| | | |
|---|---|---|
| CN | 106207357 | 12/2016 |
| WO | 2019022651 | 1/2019 |

OTHER PUBLICATIONS

CN106207357, Dec. 7, 2016, Chengdu Xanaway Technology Co., Ltd., Machine Translation (58 pages).

Goussetis, G. et al, Tailoring the AMC and EBG characteristics of periodic metallic arrays printed on grounded dielectric substrate, IEE Transactions on Antennas and Propagation, vol. 54, No. 1, Jan. 2006 (8 pages).

Oct. 6, 2022 PCT/US202/036034, International Search Report (3 pgs).

Oct. 6, 2022 PCT/US202/036034, Written Opinion (5 pgs).

* cited by examiner

PHASE-COMPENSATED WAVEGUIDES AND RELATED SENSOR ASSEMBLIES

SUMMARY

Disclosed herein are various embodiments of waveguide and/or antenna structures having phase-compensation features and/or techniques. In preferred embodiments, such structures may be used in sensor assemblies, such as RADAR or other sensor modules for vehicles.

In some embodiments, these phase-compensation features may be formed by shaping the upper (closest to the exit of the antenna structure) part of an antenna structure, such as the upper portion of the sidewalls of the antenna slot(s). For example, in some embodiments, angled and/or tapering sections may be formed along just one side of an oscillating slot (preferably the side that convexly extends towards the axial center of the slot, which may coincide with the local maxima of an oscillating pattern of the slot) at any given portion along the axis of the slot. These tapering sections may be formed in alternating semi circles, in some embodiments, along opposite sides of the slot relative to the adjacent tapering sections. Stepped tapering of the slot sidewalls and/or other tapering that need not be applied using alternating semi circles or other curved tapers may also be used in some embodiments.

Without being limited by theory, it is expected that these features may compensate for the meandering or "wiggle" of one or more antenna slots in the assembly, which may effectively change the phase center of the antenna, and thereby provide sidelobe suppression. Some of the inventive concepts disclosed herein may also, or alternatively, result in expansion of lower cutoff frequency by flattening the group delay, which may result in a more broadband behavior for the assembly/system.

In a more particular example of a waveguide assembly, such as a waveguide assembly for a vehicle sensor module, the waveguide assembly may comprise one or more waveguides, such as waveguide grooves, each extending along an elongated axis. An antenna structure, such as one or more slots extending within and/or positioned adjacent to each of the waveguide grooves, may be operably coupled with the waveguide(s) and may comprise one or more slots extending adjacent to the waveguide groove. In some embodiments, the one or more slots may comprise an elongated slot extending within each waveguide groove along its elongated axis. The antenna structure may be positioned and configured to deliver electromagnetic radiation from the waveguide therethrough, and the elongated slot of the antenna structure may intermittently oscillate on opposite sides of the elongated axis along at least a portion of the elongated axis. A plurality of tapering sections and/or surfaces may be formed within the elongated slot. Each of at least a subset or, in some embodiments, each, of the plurality of tapering surfaces may be spaced apart in a manner that coincides with the intermittent oscillation of the elongated slot.

In some embodiments, the plurality of tapering surfaces may comprise a first set of tapering surfaces on a first side of the elongated slot and a second set of tapering surfaces on a second side of the elongated slot opposite the first side. The plurality of tapering surfaces may alternate along the axis of the slot such that each tapering surface of first set of tapering surfaces is positioned adjacent to one or more tapering surfaces of the second set of tapering surfaces and each tapering surface of the second set of tapering surfaces is positioned adjacent to one or more tapering surfaces of the first set of tapering surfaces.

In some embodiments, each of the plurality of tapering surfaces may comprise a curved, tapering surface, such as a surface comprising one or more semi-circular portions and/or a partially spherical shape. In some embodiments, each of the plurality of tapering surfaces may comprise, either wholly or in part, a concave surface formed within a convex portion of a single side of the elongated slot, such as a portion defining a local maxima in the oscillating pattern of the slot.

In some embodiments, the elongated slot of the antenna structure may intermittently oscillate on opposite sides of the elongated axis in a periodic manner along at least a portion of the elongated axis in a pattern that smoothly curves between opposite sides of the elongated axis, such as a sinusoidal pattern. In some such embodiments, each of the plurality of tapering surfaces may be positioned along a relative maxima of the pattern.

In some embodiments, the waveguide may be defined by a waveguide groove, which may be defined by, for example, a trench formed between opposing, solid, sidewalls, or may be defined by one or more opposing rows of posts.

In some embodiments, the elongated slot may at least substantially define a square wave.

In an example of an antenna module according to some embodiments, the module may comprise a waveguide and an antenna structure operably coupled with the waveguide. The antenna structure may be positioned and configured to deliver electromagnetic radiation from the waveguide therethrough. The module may further comprise a plurality of tapering surfaces formed along the antenna structure, wherein each of the plurality of tapering surfaces alternates between opposing sides of the antenna structure and is spaced apart from each adjacent tapering surface of the plurality of tapering surfaces.

In some embodiments, the waveguide may comprise a waveguide groove. In some such embodiments, the antenna structure may comprise one or more slots extending within the waveguide groove.

In some embodiments, each of the plurality of tapering surfaces may be curved, at least in part. In some such embodiments, at least a portion of each of the plurality of tapering surfaces may be formed in a semi-circular shape. For example, each, or at least a subset, of the plurality of tapering surfaces may comprise, at least in part, an at least substantially circular region/portion that tapers, at least in part, between opposing surfaces of a structure defining the elongated slot.

In some embodiments, the antenna structure may intermittently oscillate, such as by providing a single, elongated slot that oscillates or a plurality of spaced slots formed in a path that oscillates along and/or adjacent to the waveguide. In some such embodiments, each of at least a subset of the plurality of tapering surfaces (or all tapering surfaces) may be spaced apart in a manner that coincides with the intermittent oscillation of the elongated slot or plurality of spaced slots.

In another example of an antenna module according to some embodiments, such as an antenna module that may be part of a RADAR sensor module or other sensor module for a vehicle, for example, the module may comprise a waveguide groove extending along an elongated axis defining a center of the waveguide groove. An antenna slot may extend between an external surface of the antenna module and an internal surface operably coupled with the waveguide groove. In some embodiments, the slot may be non-straight and may be positioned and configured to deliver electromagnetic radiation from the waveguide groove therethrough. The slot may be formed between a first lateral surface comprising at least one tapering section and at least one non-tapering section and a second lateral surface opposite the first surface comprising at least one tapering section and at least one non-tapering section.

In some embodiments, the slot may intermittently oscillate, such as oscillating in directions between opposing sidewalls of the adjacent waveguide groove. In some such embodiments, the slot may oscillate smoothly to form a curved shape having a plurality of intermittent, curved peaks, such as in a sinusoidal pattern.

In some embodiments, the first lateral surface may comprise a plurality of tapering sections, wherein each of the plurality of tapering sections of the first lateral surface is formed along one of the peaks of the slot. Similarly, the second lateral surface may comprise a plurality of tapering sections, wherein each of the plurality of tapering sections of the second lateral surface is formed along one of the peaks of the slot.

In some embodiments, one or more of the plurality of tapering sections may comprise a stepped taper, which may comprise a taper extending between a first edge of a ledge, the first edge being positioned in between the external surface and the internal surface, and a second edge of a concavely curved surface, the second edge extending along the external surface. In some such embodiments, a plurality of steps may be formed between the starting point or first edge of the taper and the external surface.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1A:
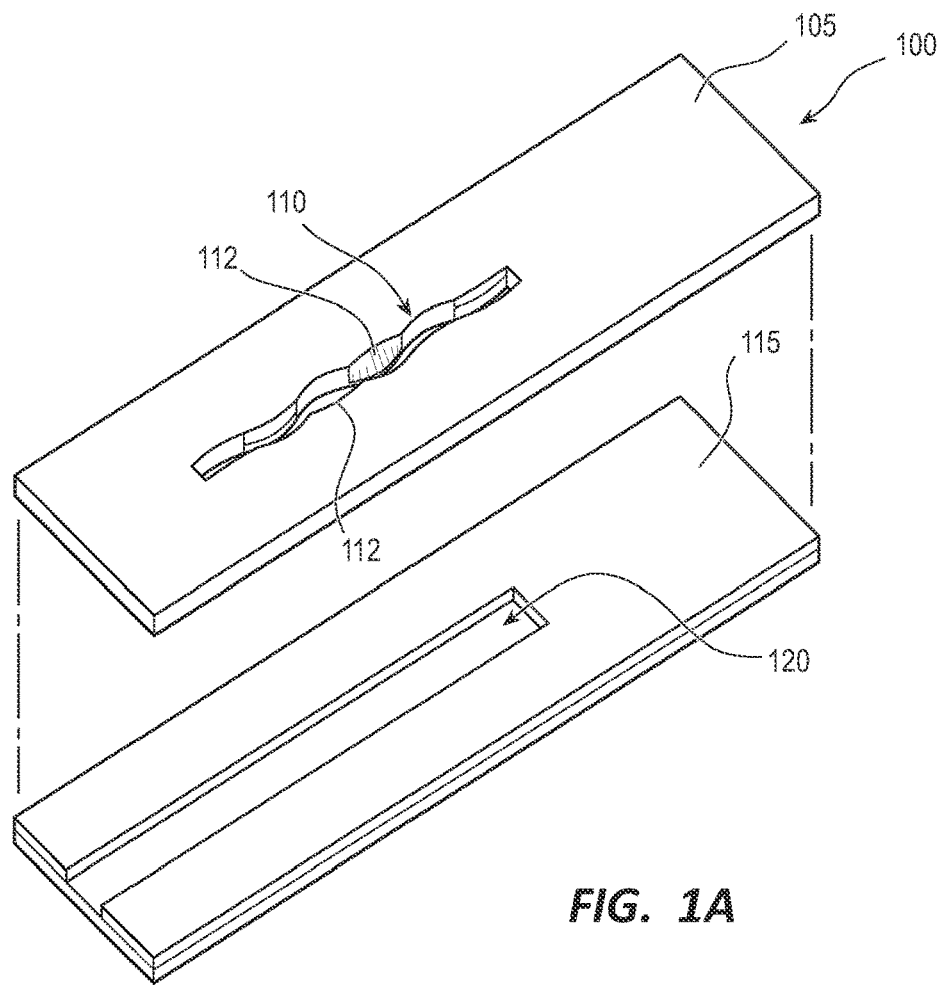
FIG. 1A is an exploded, perspective view of a combined waveguide and antenna structure according to some embodiments.

It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure but is merely representative of possible embodiments of the disclosure. In some cases, well-known structures, materials, or operations are not shown or described in detail.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1B:
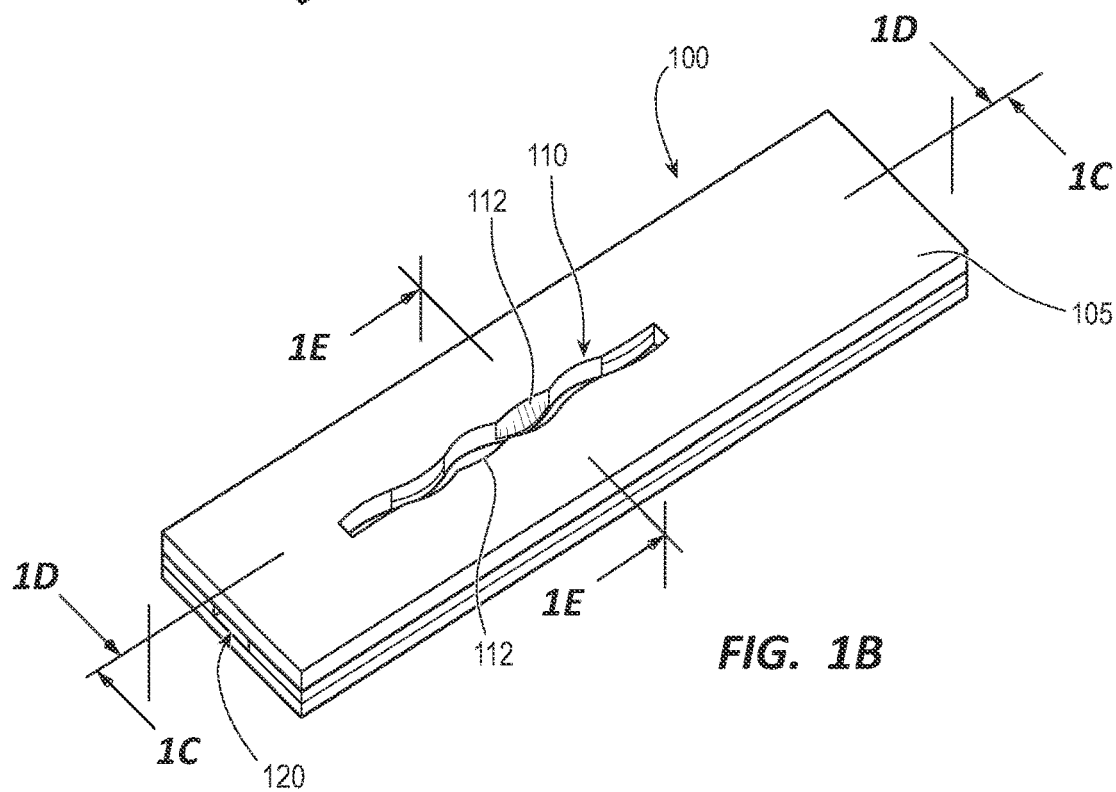
FIG. 1B is a perspective view of the waveguide and antenna structure of FIG. 1A.

FIGS. 1A and 1B depict an antenna and/or waveguide assembly 100 that defines, either in whole or in part, one or more waveguides therein and may comprise a portion of, for example, an antenna module, which antenna module may comprise one or more antennae. Waveguide assembly 100 may therefore be incorporated into or otherwise used with a vehicle sensor, such as a RADAR sensor assembly, according to some embodiments.

As depicted in FIG. 1A, waveguide assembly 100 comprises a portion, such as a layer 105, that comprises an elongated slot 110 extending therethrough. Elongated slot 110 may serve to deliver electromagnetic radiation therethrough and may therefore be considered an example of an "antenna structure" of assembly 100. It should be understood, however, that one or more slots or another antenna structure may be, in alternative embodiments, formed in another portion of the assembly/module and/or formed in an alternative manner. For example, in some embodiments, a slot may be formed within a single structure, such as a waveguide block and/or casting, within which one or more waveguides are formed, rather than being formed in a lid/plate in a separate layer, as shown in FIG. 1A.

Slot 110 oscillates back and forth between opposing sides of an elongated axis. As shown in FIGS. 1A and 1B, slot 110 is positioned directly above a rectangular-shaped waveguide groove 120 formed within another portion, which in the depicted embodiment is formed within a portion 115 of assembly 100 comprising two layers.

Again, it is contemplated that waveguide 120 may be formed in the same block/structure as slot 110 in alternative embodiments. Similarly, the structure within which waveguide 120 is formed may comprise multiple layers, such as a layer within which waveguide groove 120 is formed and another layer to serve as a cap or otherwise enclose groove 120. Alternatively, however, in some embodiments, waveguide 120 may be formed in a single structure.

In the depicted embodiment, waveguide groove 120 is formed by opposing walls and extends along an elongated axis. In addition, although this need not be the case for other embodiments, in the depicted embodiment, slot 110 is centered, or at least substantially centered, with respect to adjacent groove 120 and oscillates towards these opposing walls in an intermittent manner. It should be understood that, in alternative embodiments, a plurality of posts may be arranged in opposing rows to define a waveguide groove therebetween as shown in, for example, U.S. Patent Application Publication No. 2020/0194900 by Doyle et al., which application is hereby incorporated by reference in its entirety. Thus, waveguide grooves may be defined by forming grooves defined by continuous opposing walls or by a series of spaced posts, opposing rows of which may be define such grooves. In embodiments in which opposing rows of posts define the waveguide groove, a single groove may be defined by two opposing rows of posts (one row on each side) or, alternatively by a plurality of rows of posts on each side of each waveguide groove.

As another alternative that could apply to any of the embodiments disclosed herein, including but not limited to assembly 100, in some embodiments elongated slot 110 may be replaced by a series of smaller slots that are spaced apart. An example of a series of oscillating, spaced slots can be found in U.S. Patent Application Publication No. 2020/0194900 by Doyle et al., which was previously incorporated by reference. Using this example, every slot may comprise a phase-compensating feature, such as a taper groove or cutout (as discussed in greater detail below), with every other slot having the taper extend in an opposite direction. Alternatively, the smaller, spaced slots may be angled relative to the associated waveguide so as to extend along a curved line that may more closely approximate the curved lines shown in the elongated slots of the depicted embodiments. In some such embodiments, only the slots at the relative maxima of the oscillating path may comprise a phase-compensating feature.

It should also be understood that any number of antennae may be provided and therefore any desired number of corresponding antennae structures—such as a plurality of waveguides, grooves, etc.—may be provided. However, some embodiments may comprise an array having a single antenna and therefore only a single waveguide. As described in greater detail elsewhere in this disclosure, the waveguides described herein may be defined in a variety of ways and may curve about the block/assembly rather than be in a series of parallel lines in some embodiments. As another example, in some embodiments, grooves, slots, or the like may be arranged in a disc formation, or any other suitable formation, including linear, curved, etc. In addition, it should also be understood that the accompanying figures depict only certain elements and/or aspects of antenna assemblies and/or waveguides and that, in order to properly function, other elements would typically need to be provided in a complete assembly/module having other functional elements that are not shown or described herein to avoid obscuring the disclosure.

In preferred embodiments, waveguide assembly 100 may comprise a casting, such as a casting comprising a Zinc or other suitable preferably metal material. However, in other contemplated embodiments, assembly 100 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with assembly 100. For example, embodiments are contemplated in which assembly 100 may be combined with other layers and/or elements that are not depicted herein to avoid obscuring the disclosure, to form an antenna and/or sensor assembly/module, which may but need not in all contemplated embodiments comprise a vehicle sensor assembly/module.

Assembly 100 further comprises features configured for implementation of a phase-compensation technique. In the depicted embodiment, this is accomplished by applying one or more angled and/or tapered sections, such as tapered grooves or cutouts, along the slot 110. Thus, the depicted embodiment illustrates a tapered and/or angled section/surface 112 that is formed along both opposing sidewalls defining slot 110.

In preferred embodiments, these sections/surfaces 112 are positioned so as to alternate and be staggered along the opposing slot sidewalls such that each section 112 is positioned at a particular point along the axis of slot 110 along only one sidewall of slot 110 and each section 112 is positioned along only the opposite sidewall as each section 112 adjacent thereto. In addition, even more preferably, each section 112 is formed along one of the peaks of an oscillating slot 110. Thus, for example, if the slot defines, or at least substantially defines, a sine wave, each of the sections 112 is preferably formed along one of the peaks of the sine wave extending towards the axial center of the slot 110 and/or waveguide 120.

In some embodiments, all of the aforementioned peaks may comprise a phase-compensating feature, such as a tapering section 112. Alternatively, only a subset of the peaks defined by slot 110 may comprise such a feature.

In some embodiments, slot 110 may intermittently oscillate on opposite sides of the elongated axis of the slot 110 and/or adjacent waveguide 120 along at least a portion thereof. In some such embodiments, each of at least a subset of the plurality of the tapering surfaces/sections 112 may be spaced apart in a manner that coincides with the intermittent oscillation of the slot 110. In some such embodiments, all of the tapering surfaces/sections 112 may be spaced apart in a manner that coincides with the intermittent oscillation of the slot 110.

Thus, for example, in some embodiments, each of the plurality of tapering sections surfaces 112 may comprise a first set of tapering surfaces on a first side of the slot 110 a second set of tapering surfaces on a second side of the slot 110 opposite the first side. Preferably, the tapering surfaces/sections 112 alternate such that each tapering surface of first set of tapering surfaces is positioned adjacent to one or more tapering surfaces of the second set of tapering surfaces along the axis of the slot 110 and each tapering surface of the second set of tapering surfaces is positioned adjacent to one or more tapering surfaces of the first set of tapering surfaces along the axis, again, preferably alternating back and forth across the slot 110.

Figures 1C, 1D, 1E:
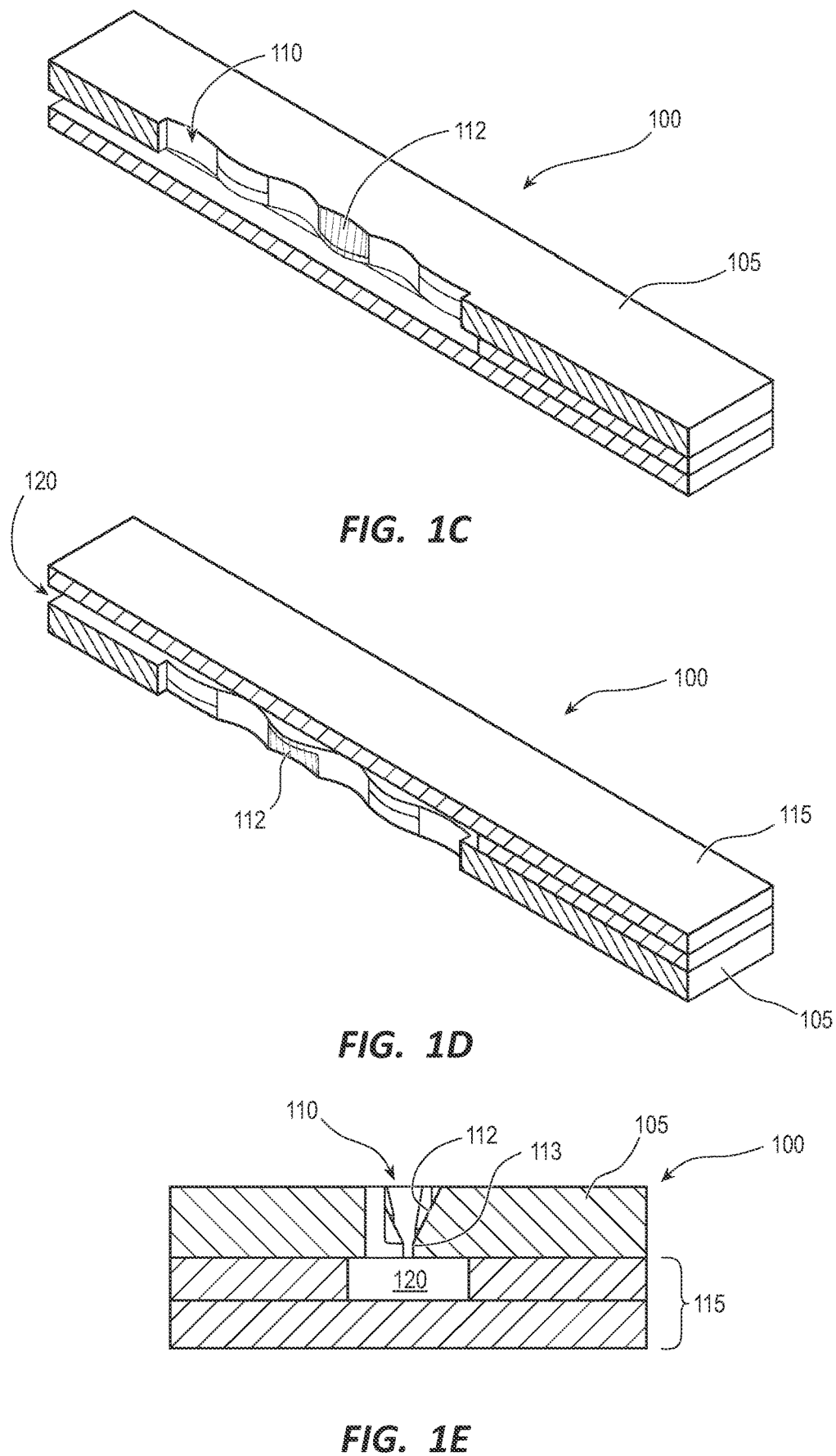
FIG. 1C is a cross-sectional view taken along line 1C-1C in FIG. 1B.
FIG. 1D is a cross-sectional view taken along line 1D-1D in FIG. 1B.
FIG. 1E is a cross-sectional view taken along line 1E-1E in FIG. 1B.

Each of the plurality of tapering surfaces/sections 112 may comprise a curved, tapering surface, as shown in FIGS. 1A-1E. Indeed, in the depicted embodiment of these figures, each of the tapering surfaces/sections 112 is defined, at least in part, by a semi-circular cutout, which may be formed at the exterior surface of slot 110, as shown in FIG. 1C, as a concave region from the convex region of the curve defined by slot 110, and then may taper down to a corner, edge, or starting point 113 of the taper, as best seen in FIG. 1E. Thus, preferably, the tapers of sections 112 do not extend all the way between opposing surfaces of layer 105 or another portion of assembly 100 defining slot 110, but rather start at a point between the opposing surfaces of layer 105, as shown in FIG. 1E at 113, and extends to the upper/outer portion of slot 110.

However, in embodiments in which one or more of the tapering sections 112 has a starting point between opposing surfaces of the structure defining the slot(s) 110, it may be desirable from a manufacturing standpoint that the starting point 113 be sufficiently spaced from the (typically inner) surface from which the slot(s) originates. Thus, in some embodiments, the starting point may be located at a point no less than 20%, or no less than about 20%, of the distance from the lower/inner and/or originating surface of the slot(s) to the upper/outer and/or terminating surface of the slot(s).

As discussed below in connection with later figures, other embodiments are contemplated in which the tapering surfaces/sections may instead be straight or non-curved. In addition, in some embodiments, the curvature of the tapering section 112 may extend in multiple dimensions. In other words, a semi-spherically curved surface may be formed within one or more of these sections 112 if desired.

Finally, although two layers are shown forming the portion 115 of assembly 100 defining waveguide 120, again, fewer or greater number of layers may be used to form this section of the module/assembly 100 in alternative embodiments.

FIGS. 2A-2E depict an alternative antenna and/or waveguide assembly 200 that defines, either in whole or in part, one or more waveguides therein and may comprise a portion of, for example, an antenna module, which antenna module may comprise one or more antennae. Waveguide assembly 200 may therefore be incorporated into or otherwise used with a vehicle sensor, such as a RADAR sensor assembly, according to some embodiments.

Figure 2A:
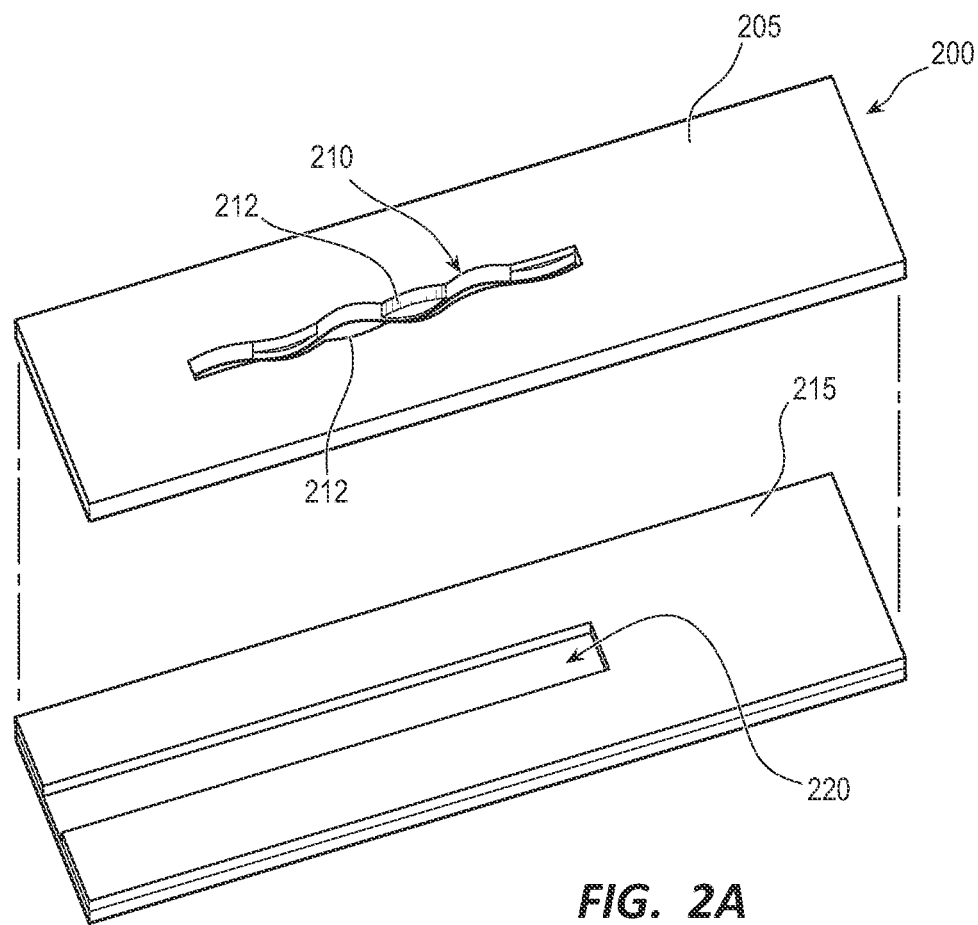
FIG. 2A is an exploded, perspective view of a combined waveguide and antenna structure according to other embodiments.
Figure 2B:
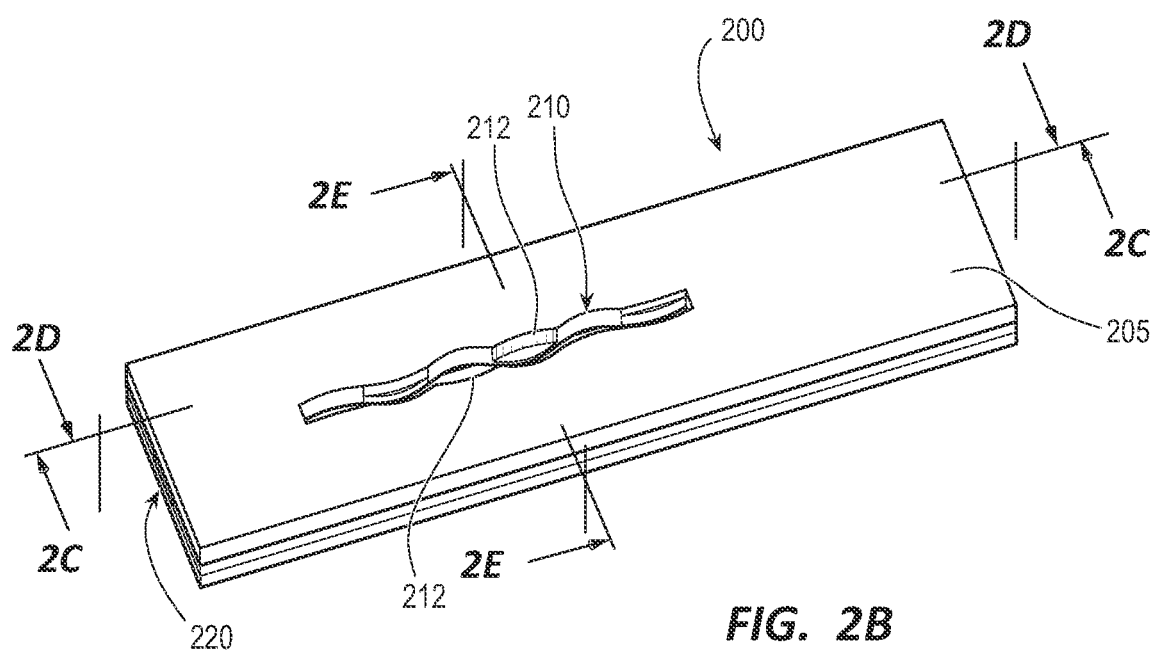
FIG. 2B is a perspective view of the waveguide and antenna structure of FIG. 2A.
Figure 2C:
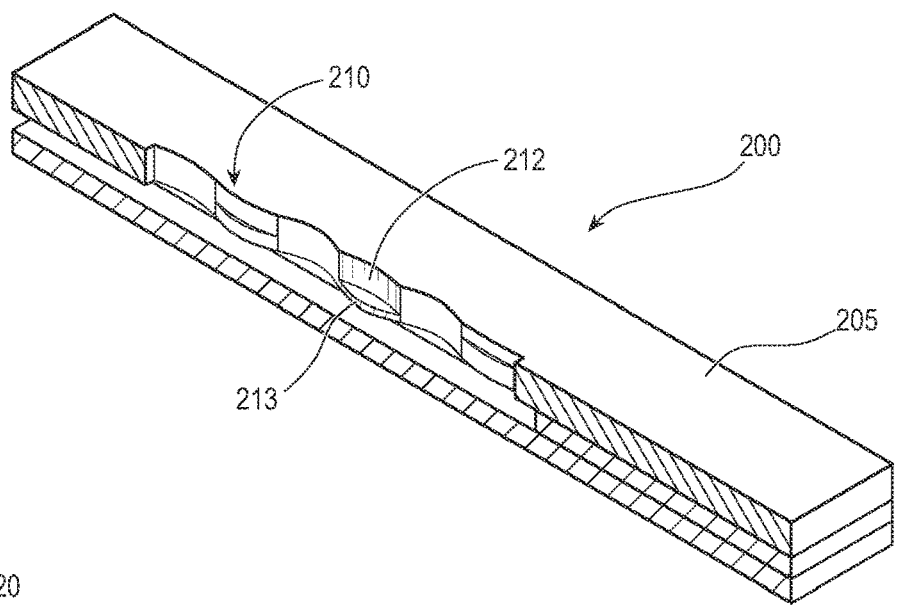
FIG. 2C is a cross-sectional view taken along line 2C-2C in FIG. 2B.
Figure 2D:
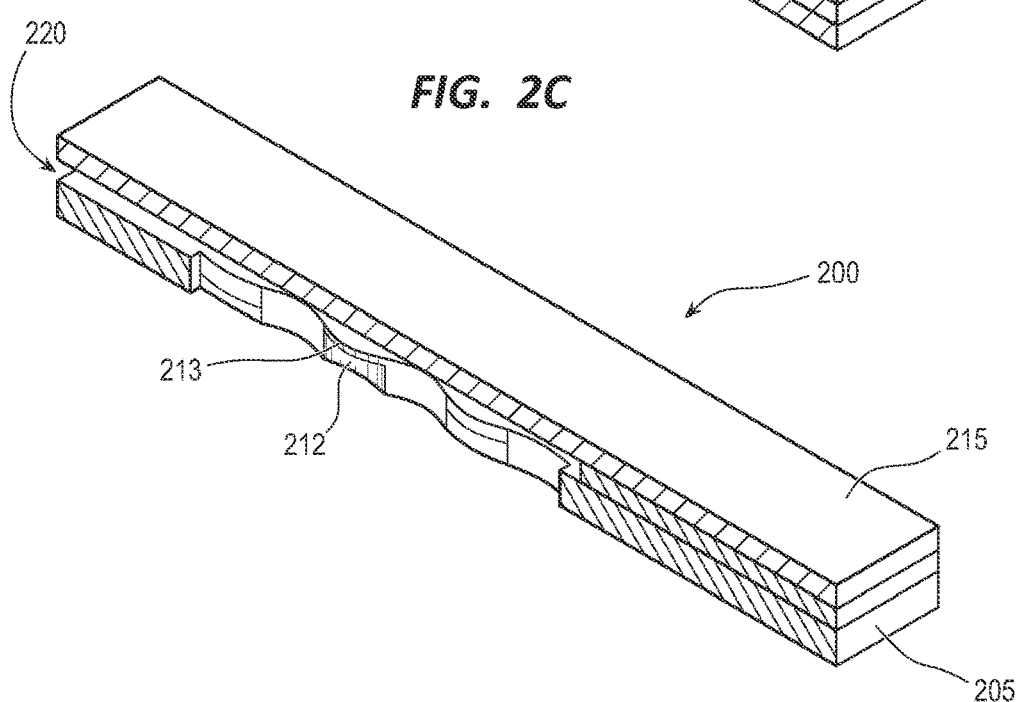
FIG. 2D is a cross-sectional view taken along line 2D-2D in FIG. 2B.

As depicted in FIG. 2A, waveguide assembly 200 comprises a portion, such as a layer 205, that comprises an elongated slot 210 extending therethrough. Elongated slot 210 may serve to deliver electromagnetic radiation therethrough and may therefore be considered an example of an "antenna structure" of assembly 200.

Slot 210, like slot 110, oscillates back and forth between opposing sides of an elongated axis. Also like slot 110, slot 210 is positioned directly above a rectangular-shaped waveguide groove 220, which is formed by opposing walls and extends along an elongated axis. In addition, in the depicted embodiment, slot 210 is centered, or at least substantially centered, with respect to adjacent groove 220 and oscillates towards these opposing walls in an intermittent manner.

Assembly 200 further comprises features configured for implementation of a phase-compensation technique. In the depicted embodiment, this is again accomplished by applying one or more angled and/or tapered sections, such as tapered grooves or cutouts, along the slot 210. Thus, the depicted embodiment illustrates a tapered and/or angled section/surface 212 that is formed along both opposing sidewalls defining slot 210 at respective points of maxima for the oscillating pattern of slot 210.

Figure 2E:
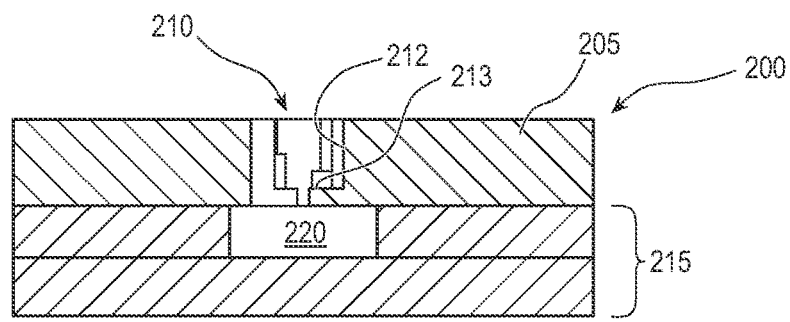
FIG. 2E is a cross-sectional view taken along line 2E-2E in FIG. 2B.

However, unlike slot 110, slot 210 comprises tapering sections 212 that comprise a stepped taper rather than a smoothly transitioning taper. In other words, a ledge 213 is formed at the starting point of the taper and therefore, rather than a smooth taper between the outer surface of layer 205 and the starting point of section 212, the transition of tapering section 212 is immediate from the starting point, which is at ledge 213, of section 212 to the outer surface of layer 205, as best shown in FIG. 2E.

Again, in some embodiments, all of the peaks/maxima of the oscillating pattern of slot 210 may comprise a phase-compensating feature, such as a tapering section 212. Alternatively, in some embodiments, only a subset of the peaks/maxima defined by slot 210 may comprise such a feature.

In addition, as with assembly 100 and slot 110, slot 210 may intermittently oscillate on opposite sides of the elongated axis of the slot 210 and/or adjacent waveguide 220 along at least a portion thereof. In some such embodiments, each of at least a subset of the plurality of the tapering surfaces/sections 212 may be spaced apart in a manner that coincides with the intermittent oscillation of the slot 210. In some such embodiments, all of the tapering surfaces/sections 212 may be spaced apart in a manner that coincides with the intermittent oscillation of the slot 210.

It should be understood, however, that the stepped taper of assembly 200 is but an example for purposes of illustration and that a wide variety of alternative embodiments are contemplated. For example, although only a single step is used in the tapered section 212 of assembly 200, any number of steps may be used in between the one step shown in this embodiment and an effective infinite number of steps involved in a smooth taper, such as the smooth taper of section 112.

Each of the tapering sections 212 of assembly 200 may comprise a stepped taper extending between a first edge of ledge 213, which first edge may be positioned in between the external surface of portion 205 and the internal surface of portion 205, and a second edge of a concavely curved surface (in some cases, a semi-circular concavely curved surface), the second edge extending along the external surface of portion 205. Again, any number of intermediate steps may be used as desired.

In addition, assembly 200 may comprise multiple layers, such as sections/layers 205 and 215 as shown in FIG. 2E, or each of the elements may be defined within a single, monolithic piece of material, if desired.

FIGS. 3A-3E depict another alternative antenna and/or waveguide assembly 300 that defines, either in whole or in part, one or more waveguides therein and may comprise a portion of, for example, an antenna module, which antenna module may comprise one or more antennae. Waveguide assembly 300 may therefore, once again, be incorporated into or otherwise used with a vehicle sensor, such as a RADAR sensor assembly, according to some embodiments.

Figure 3A:
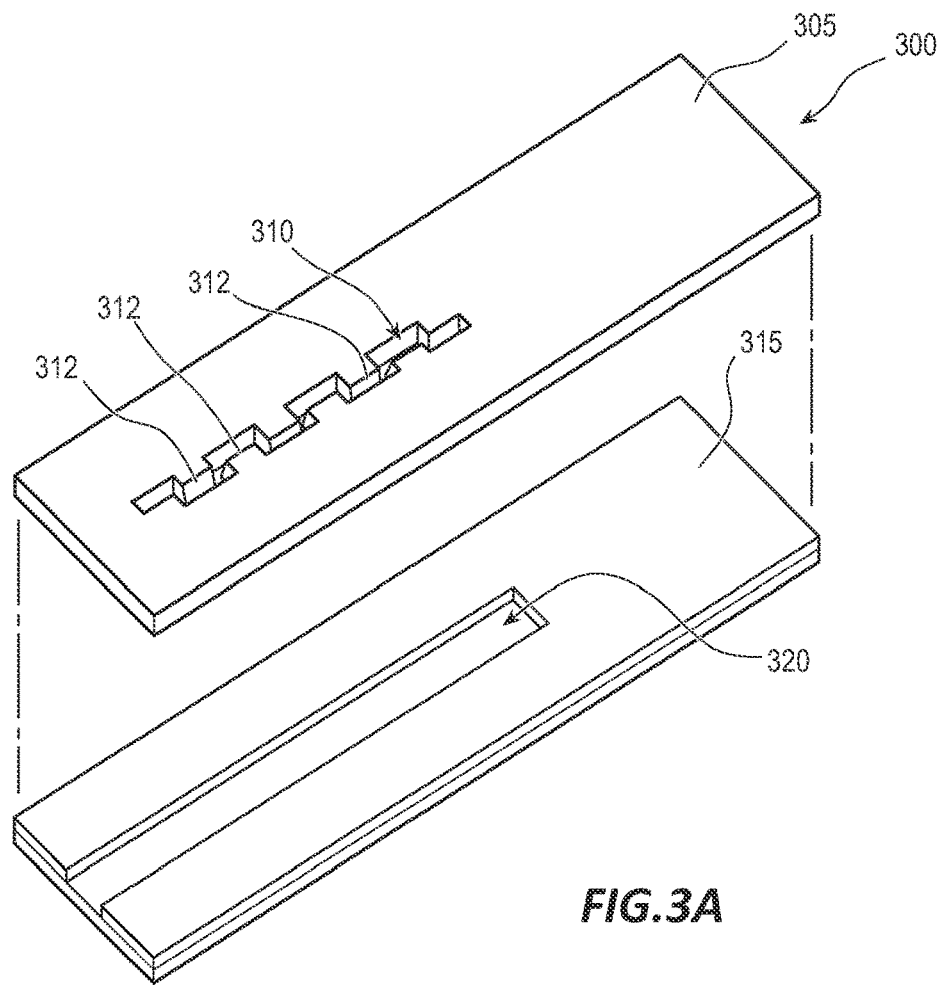
FIG. 3A is an exploded, perspective view of a combined waveguide and antenna structure according to still other embodiments.
Figure 3B:
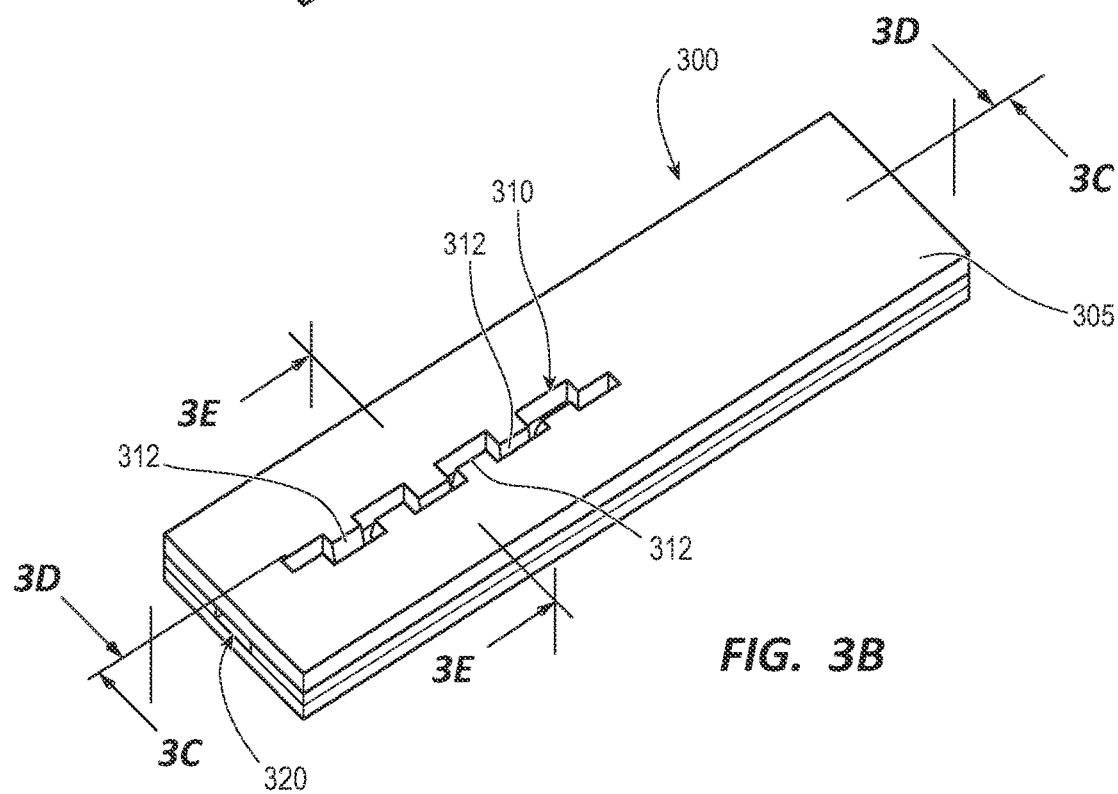
FIG. 3B is a perspective view of the waveguide and antenna structure of FIG. 3A.
Figure 3C:
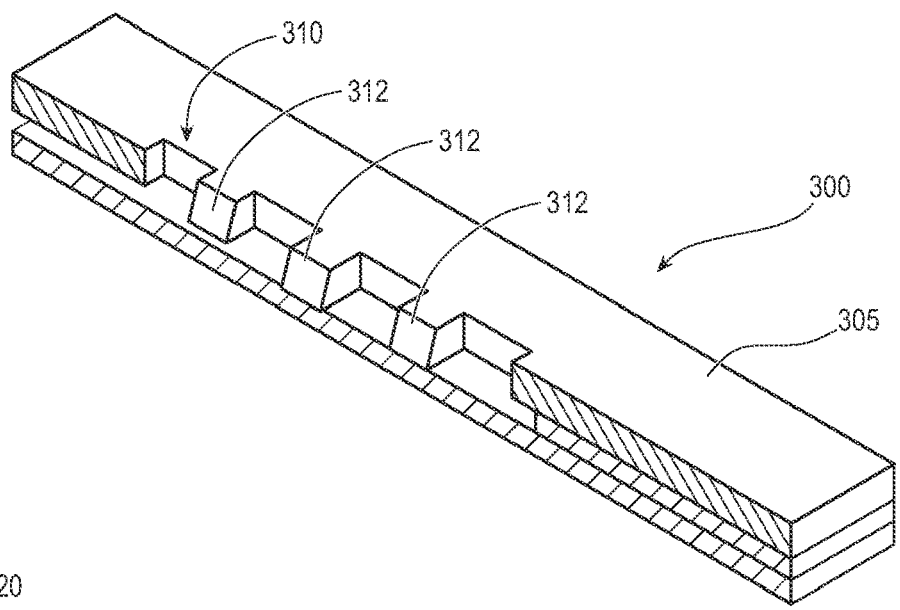
FIG. 3C is a cross-sectional view taken along line 3C-3C in FIG. 3B.
Figure 3D:
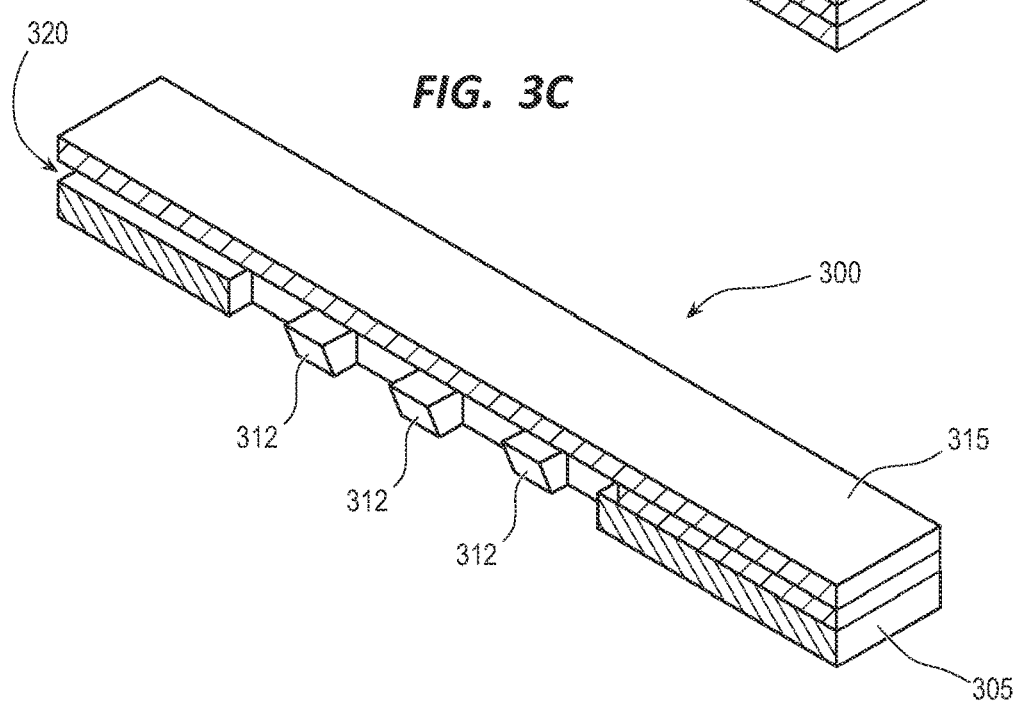
FIG. 3D is a cross-sectional view taken along line 3D-3D in FIG. 3B.

As depicted in FIG. 3A, waveguide assembly 300 comprises a portion, such as a layer 305, that comprises an elongated slot 310 extending therethrough. Elongated slot 310 may serve to deliver electromagnetic radiation therethrough and may therefore be considered an example of an "antenna structure" of assembly 300.

Slot 310, like slots 110 and 210, oscillates back and forth between opposing sides of an elongated axis. Also like slots 110 and 210, slot 310 is positioned directly above a rectangular-shaped waveguide groove 320, which is formed by opposing walls and extends along an elongated axis. In addition, in the depicted embodiment, slot 310 is centered, or at least substantially centered, with respect to adjacent groove 320 and oscillates towards these opposing walls in an intermittent manner.

However, unlike slots 110 and 210, slot 310 oscillates in a non-smooth manner. More particularly, slot 310 at least substantially defines a square wave.

Assembly 300 further comprises features configured for implementation of a phase-compensation technique. In the depicted embodiment, this is again accomplished by applying one or more angled and/or tapered sections, such as tapered grooves or cutouts, along the slot 310. Thus, the depicted embodiment illustrates a tapered and/or angled section/surface 312 that is formed along both opposing sidewalls defining slot 310 at respective points of maxima for the oscillating pattern of slot 310.

Again, in some embodiments, all of the peaks/maxima of the oscillating pattern of slot 310 may comprise a phase-compensating feature, such as a tapering sections 312. Alternatively, in some embodiments, only a subset of the peaks/maxima defined by slot 310 may comprise such a feature.

Figure 3E:
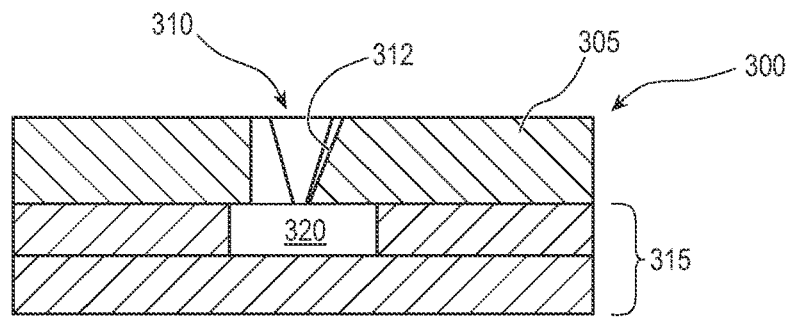
FIG. 3E is a cross-sectional view taken along line 3E-3E in FIG. 3B.

As best shown in FIG. 3E, the taper of sections 312 may extend the entire distance between the upper and lower surfaces of portion/layer 305. However, alternatively, the taper may start/stop at a particular point in between these two surfaces, as shown and illustrated in connection with the previous embodiments.

Again, assembly 300 may comprise multiple layers, such as sections/layers 305 and 315 as shown in FIG. 3E, or each of the elements may be defined within a single, monolithic piece of material, if desired.

Various other alternative features/embodiments are contemplated. For example, in some embodiments, a series of spaced slots may be provided rather than a single, elongated slot, for a given waveguide. Such spaced slots may, but need not, oscillate. In addition, the aforementioned tapered/angled sections/surfaces may be formed in some or all such spaced slots. For example, in some embodiments, the tapering sections may be formed in every slot but may alternate on sides such that every In embodiments in which a separate layer is used for the antenna slot(s), preferably this layer comprises a metal or other conductive material, which may be similar or identical to the material used to form the adjacent, operably coupled waveguides. Such a slotted layer may be coupled with the waveguide(s) in a variety of possible ways. For example, an adhesive, solder, epoxy, heat stakes, screws, other fasteners, and the like may be used to couple the slotted layer to the block. Similar structures and/or techniques may be used to couple other layers or other elements of the assembly together, such as coupling the casting to a substrate and/or PCB, for example. In some embodiments, another layer, such as a layer of (preferably conductive) adhesive tape, may be inserted in between the block and the slotted layer, which may, either entirely or in part, be used to provide this coupling.

As those of ordinary skill in the art will appreciate, antenna/waveguide/sensor assemblies incorporating the waveguide/antenna structures described herein may further comprise a PCB or other electromagnetic-generating element from which electromagnetic waves may be generated to feed one or more waveguide structures. These elements may be provided in a separate layer or, alternatively, may be provided in the same layer.

It should also be understood that, whereas the block structures shown in the accompanying figures are generally shown with a single groove, which may be thought of as providing a single "antenna" when coupled with one or more adjacent slots, any number of waveguide grooves and/or adjacent slot and/or antenna structures may be provided as desired, and each such waveguide and/or waveguide groove may be associated with a different antenna of the antenna block/assembly.

It should also be understood that whereas preferred embodiments may be used in connection with vehicle sensors, such as vehicle RADAR modules or the like, the principles disclosed herein may be used in a wide variety of other contexts, such as other types of RADAR assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A waveguide assembly, comprising:
   a waveguide extending along an elongated axis;

an antenna structure operably coupled with the waveguide and comprising an elongated slot extending within the waveguide along the elongated axis, wherein the antenna structure is positioned and configured to deliver electromagnetic radiation from the waveguide therethrough, and wherein the elongated slot of the antenna structure intermittently oscillates on opposite sides of the elongated axis along at least a portion of the elongated axis; and a plurality of tapering surfaces formed within the elongated slot, wherein each of at least a subset of the plurality of tapering surfaces is spaced apart in a manner that coincides with the intermittent oscillation of the elongated slot.

2. The waveguide assembly of claim 1, wherein the plurality of tapering surfaces comprises:

a first set of tapering surfaces on a first side of the elongated slot; and a second set of tapering surfaces on a second side of the elongated slot opposite the first side, wherein the plurality of tapering surfaces alternates such that each tapering surface of first set of tapering surfaces is positioned adjacent to one or more tapering surfaces of the second set of tapering surfaces and each tapering surface of the second set of tapering surfaces is positioned adjacent to one or more tapering surfaces of the first set of tapering surfaces.

3. The waveguide assembly of claim 1, wherein each of the plurality of tapering surfaces comprises a curved, tapering surface.

4. The waveguide assembly of claim 3, wherein each of the plurality of tapering surfaces comprises, at least in part, a concave surface formed within a convex portion of a single side of the elongated slot.

5. The waveguide assembly of claim 1, wherein the elongated slot of the antenna structure intermittently oscillates on opposite sides of the elongated axis in a periodic manner along at least a portion of the elongated axis, wherein the elongated slot of the antenna structure intermittently oscillates on opposite sides of the elongated axis in a pattern that smoothly curves between opposite sides of the elongated axis, and wherein each of the plurality of tapering surfaces is positioned along a relative maxima of the pattern.

6. The waveguide assembly of claim 5, wherein the pattern is at least substantially a sinusoidal pattern.

7. The waveguide assembly of claim 1, wherein the waveguide is defined by a waveguide groove.

8. The waveguide assembly of claim 7, wherein the waveguide groove is defined by one or more opposing rows of posts.

9. The waveguide assembly of claim 1, wherein the elongated slot at least substantially defines a square wave.

10. An antenna module, comprising:

a waveguide; and an antenna structure operably coupled with the waveguide, wherein the antenna structure is positioned and configured to deliver electromagnetic radiation from the waveguide therethrough; and a plurality of tapering surfaces formed along the antenna structure, wherein each of the plurality of tapering surfaces alternates between opposing sides of the antenna structure and is spaced apart from each adjacent tapering surface of the plurality of tapering surfaces.

11. The antenna module of claim 10, wherein the waveguide comprises a waveguide groove, and wherein the antenna structure comprises an elongated slot extending within the waveguide groove.

12. The antenna module of claim 10, wherein each of the plurality of tapering surfaces is curved, at least in part.

13. The antenna module of claim 12, wherein each of the plurality of tapering surfaces comprises, at least in part, an at least substantially circular region that tapers, at least in part, between opposing surfaces of a structure defining the elongated slot.

14. The antenna module of claim 10, wherein the antenna structure comprises one or more slots, and wherein the one or more slots extend along a path that intermittently oscillates along the waveguide.

15. The antenna module of claim 14, wherein each of at least a subset of the plurality of tapering surfaces is spaced apart in a manner that coincides with the intermittent oscillation of the one or more slots.

16. An antenna module, comprising:

a waveguide groove extending along an elongated axis defining a center of the waveguide groove; and a slot extending between an external surface of the antenna module and an internal surface operably coupled with the waveguide groove, wherein the slot is non-straight and is positioned and configured to deliver electromagnetic radiation from the waveguide groove therethrough, wherein the slot is formed between a first lateral surface comprising at least one tapering section and at least one non-tapering section and a second lateral surface opposite the first surface comprising at least one tapering section and at least one non-tapering section.

17. The antenna module of claim 16, wherein the slot intermittently oscillates.

18. The antenna module of claim 17, wherein the slot oscillates smoothly to form a curved shape having a plurality of intermittent, curved peaks.

19. The antenna module of claim 18, wherein the first lateral surface comprises a plurality of tapering sections, wherein each of the plurality of tapering sections of the first lateral surface is formed along one of the peaks of the slot, wherein the second lateral surface comprises a plurality of tapering sections, and wherein each of the plurality of tapering sections of the second lateral surface is formed along one of the peaks of the slot.

20. The antenna module of claim 19, wherein each of the plurality of tapering sections comprises a stepped taper extending between a first edge of a ledge, the first edge being positioned in between the external surface and the internal surface, and a second edge of a concavely curved surface, the second edge extending along the external surface.

* * * * *